US008626909B2

(12) United States Patent
Feng et al.

(10) Patent No.: US 8,626,909 B2
(45) Date of Patent: Jan. 7, 2014

(54) PAGE PHASE TIME

(75) Inventors: Chao Feng, Issaquah, WA (US); Yi Chai, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 45 days.

(21) Appl. No.: 13/477,779

(22) Filed: May 22, 2012

(65) Prior Publication Data

US 2013/0318227 A1 Nov. 28, 2013

(51) Int. Cl.
*G06F 15/173* (2006.01)

(52) U.S. Cl.
USPC ............ 709/224; 382/219; 370/252; 714/47.1

(58) Field of Classification Search
USPC .................................................. 382/219, 221
See application file for complete search history.

(56) References Cited

U.S. PATENT DOCUMENTS

| | | | |
|---|---|---|---|
| 7,213,059 B2 | 5/2007 | Bhogal et | |
| 7,634,562 B2 | 12/2009 | Litofsky et al. | |
| 7,765,295 B2 | 7/2010 | Anastas et al. | |
| 2004/0221034 A1* | 11/2004 | Kausik et al. | 709/224 |
| 2009/0172703 A1* | 7/2009 | Nakano et al. | 719/318 |
| 2010/0325615 A1 | 12/2010 | Ramot | |
| 2012/0317271 A1* | 12/2012 | Funk et al. | 709/224 |
| 2013/0121599 A1* | 5/2013 | Shmouely et al. | 382/219 |

OTHER PUBLICATIONS

Rajamony, R. and Elnozahy, M., "Measuring Client-Perceived Response Times on the WWW", (2001), USENIX Symposium on Internet Technologies and Systems, pp. 4-5.*

Meenan, P., "How Fast is Your Website?", (Apr. 2013), Communications of the ACM, vol. 56, No. 4., pp. 49-55.*
Brutlag, J., Abrams, Z., and Meenan, P., "Above the Fold Time: Measuring Web Page Performance Visually", (2011), http://cdn.oreillystatic.com/en/assets/1/event/62/Above%20the%20Fold%20Time_%20Measuring%20Web%20Page%20Performance%20Visually%20Presentation.pdf.*
Li, Zhichun et al., "WebProphet: Automating Performance Prediction for Web Services," Proceedings of the 7th USENIX Conference on Networked Systems Design and Implementation, pp. 1-16 (Apr. 28, 2010) <http://research.microsoft.com/en-us/people/mzh/webprophet.pdf>.
"How Does Real User Monitoring Work?" New Relic, Inc., pp. 5 (Retrieved Date: Apr. 2, 2012) <http://newrelic.com/docs/features/how-does-real-user-monitoring-work>.
Souders, Steve, "Episodes: a Framework for Measuring Web Page Load Times," pp. 1-10 (Jul. 2008) <http://stevesouders.com/episodes/paper.php>.
"Measuring Load time for a Web Page," pp. 1, (Published Date: Jan. 11, 2010) <http://technet.microsoft.com/en-us/library/cc778898%WS.10%29.aspx>.

* cited by examiner

*Primary Examiner* — Luu Pham
*Assistant Examiner* — Gregory M Elmore (57) ABSTRACT

A method of measuring load time for a web page includes video recording a duration of the web page load including capturing N frames in a series of frames 1 through N of the web page. The method includes comparing each frame from frame 1 through frame N−1 with a next frame from frame 2 through frame N in the series of frames to determine a pixel change amount between the compared frames. The method includes defining a series of page phases for the duration of the web page load, each page phase defined by a start time and an end time with each phase start time determined based on estimating user perceptible pixel change amount levels.

11 Claims, 6 Drawing Sheets

PAGE PHASE TIME

BACKGROUND

In today's web performance industry, one example measurement standard for page load time (PLT) is based on determining a start rendering time and finish rendering time. Start rendering time in this PLT measurement standard is defined as the time when a web page starts rendering something on the computer screen. Finish rendering time in this PLT measurement standard is defined as the time when a web page finishes rendering all the content of the given web page on the computer screen. Finish rendering time is also referred to as above folder time (AFT). Another example PLT measurement standard is referred to as time to last byte (TTLB).

These above example PLT measurement standards can be employed with many static web pages which do not have significant rich content and/or content changing dynamically after the content gets downloaded. Web sites, however, are increasingly getting fancier with more rich content and more dynamic content (e.g., dynamic images, videos, Adobe Flash content, etc.). The above example PLT measurement standards are not easily employed with rich content and/or dynamic content web pages and the measurement results can be ambiguous.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The disclosure is directed to a page phase time (PPT) method of measuring load time for a web page including video recording a duration of the web page load including capturing N frames in a series of frames 1 through N of the web page. The PPT method includes comparing each frame from frame 1 through frame N−1 with a next frame from frame 2 through frame N in the series of frames to determine a pixel change amount between the compared frames. The PPT method includes defining a series of page phases for the duration of the web page load. Each page phase defined by a start time and an end time with each phase start time determined based on estimating user perceptible pixel change amount levels.

One embodiment of the PPT method reports corresponding different information defining corresponding different selected page phases in the series of page phases to corresponding different teams.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals and other indicators (collectively alpha-numerics in this disclosure) designate corresponding similar features.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is also to be understood that features of the various exemplary embodiments described herein may be combined with each other, unless specifically noted otherwise.

Figure 1:
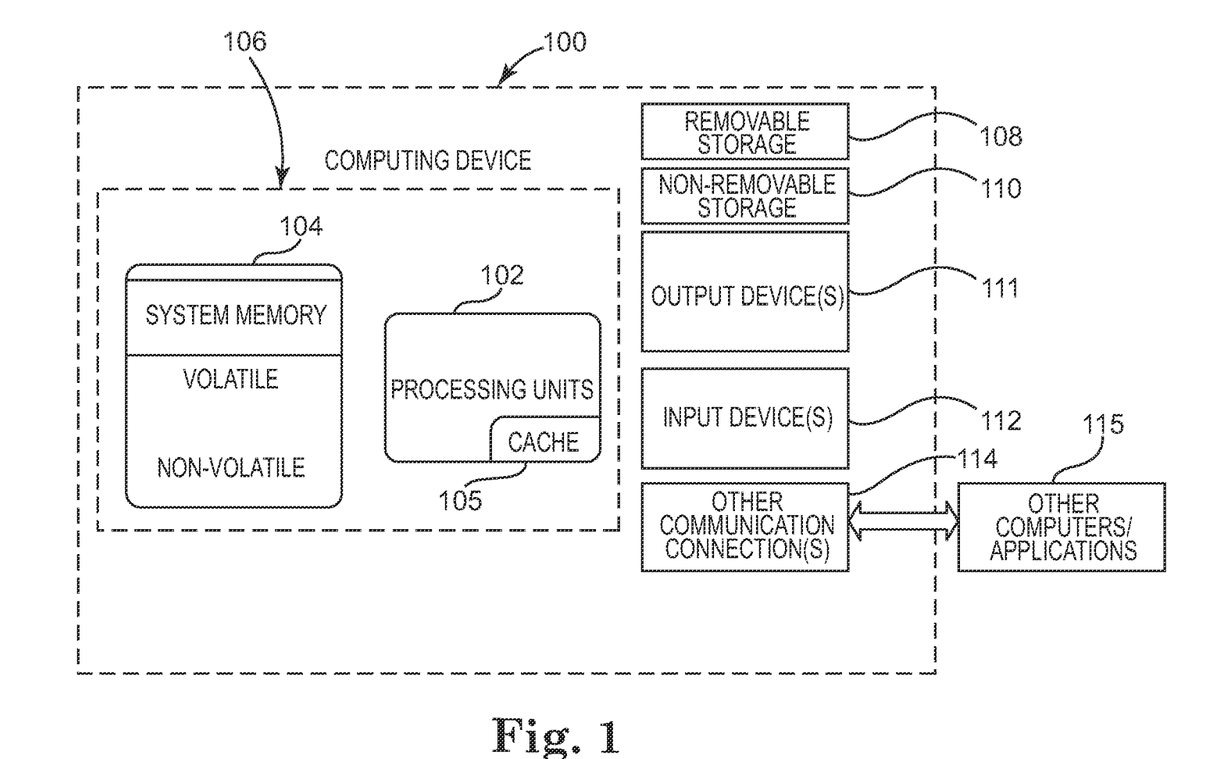
FIG. 1 is a block diagram illustrating an example computing device that can implement page phase time (PPT) methods.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. Each of the processing units include a cache 105 interposed between the processor 102 and the memory 104. This basic configuration is illustrated in FIG. 1 by line 106. The computing device can take one or more of several forms. Such forms include a personal computer, a server, a handheld device, a consumer electronic device (such as a video game console), or other.

Computing device 100 can also have additional features/functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB)

flash drive, flash memory card, or other flash storage devices, or any other storage medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

The computing device 100 can be configured to run an operating system software program and one or more software applications, which make up a system platform. In one example, the computing device 100 includes a software component referred to as a managed environment. The managed environment can be included as part of the operating system or can be included later as a software download. The managed environment typically includes pre-coded solutions to common programming problems to aid software developers to create software programs such as applications to run in the managed environment, and it also typically includes a virtual machine that allows the software applications to run in the managed environment so that the programmers need not consider the capabilities of the specific processors 102. A managed environment can include cache coherency protocols and cache management algorithms.

The computing device 100 can be coupled to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
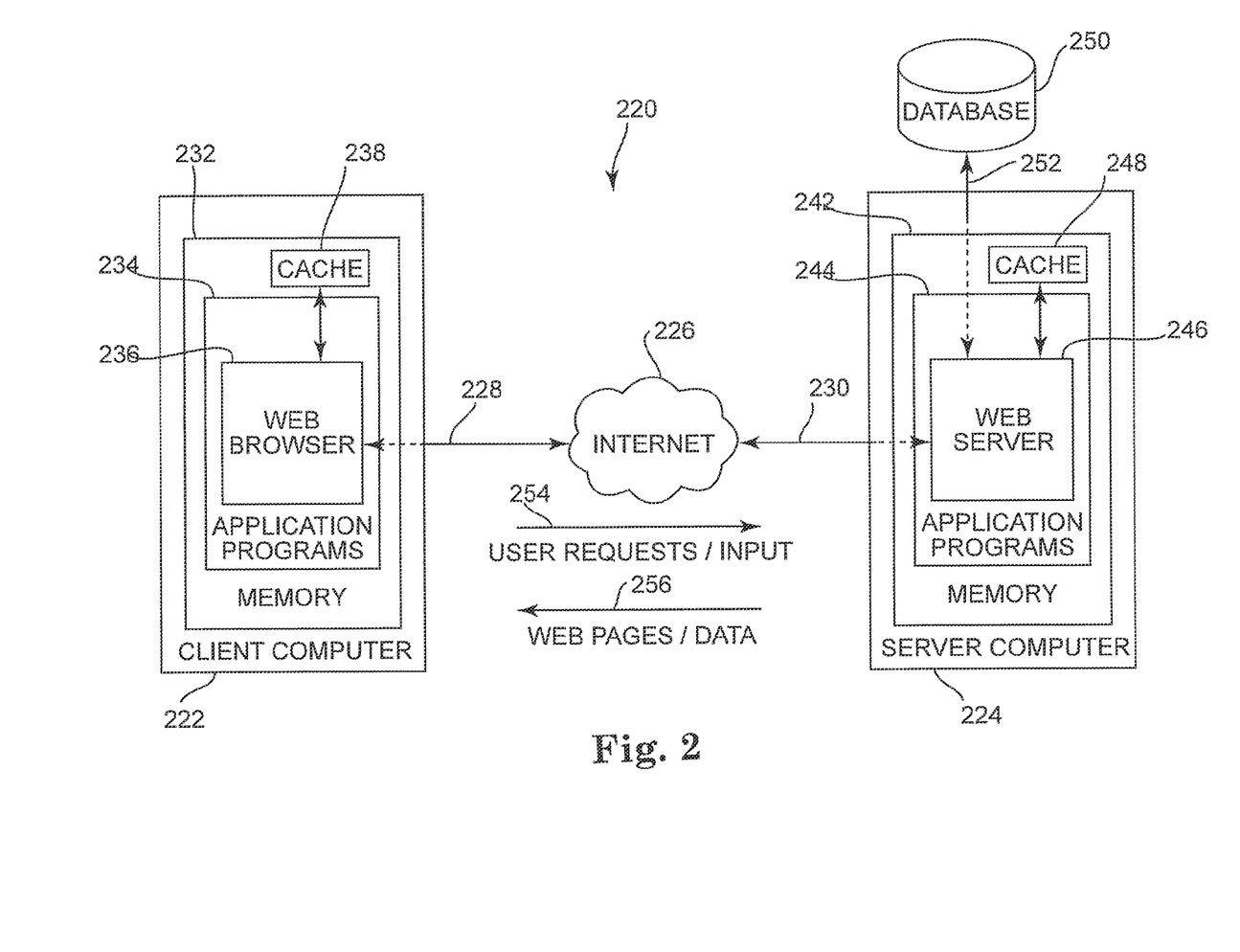
FIG. 2 is a block diagram of one embodiment of a networked Internet environment including a client computer and a server computer.

One embodiment of a networked Internet environment 220 is illustrated in block diagram form in FIG. 2. Networked Internet environment 220 includes a client computer 222 and a server computer 224. Client computer 222 is coupled to server computer 224 via the Internet indicated at 226. Client computer 222 is coupled to Internet 226 via bi-directional communication paths 228. Server computer 224 is coupled to Internet 226 via bi-directional communication paths 230.

The embodiments described herein can be implemented in any corresponding suitable client computer environment or corresponding suitable server computer environment. Client computer 222 or server computer 224 can each be implemented with a suitable computing device, such as computing device 100. In one embodiment, however, server computer 224 includes a larger hard drive and more memory capacity (e.g., more random access memory (RAM)) compared to client computer 222.

Client computer 222 includes memory 232 which stores application programs 234 which are locally executed on client computer 222. Application programs 234 include a web browser 236. Client computer 222 includes a cache 238 for storing recently requested web pages and web data.

Server computer 224 includes memory 242 which stores application programs 244 which are locally executed on server computer 224. Application programs 244 include a web server 246. Server computer 224 includes a cache 248 for storing recently accessed or pre-fetched web pages and/or data.

A database 250 stores web pages and other web data in database files. Database 250 bi-directionally communicates with web server 246 via communication paths 252. In one embodiment, database 250 is implemented in a remote computer or other remote device. In one embodiment, database 250 is implemented in server computer 224. In either embodiment, web server 246 can access data stored in cache 248 faster that it can access data stored in database 250.

Generally, web browser 236 makes user requests and/or provides user input as indicated at 254 via Internet 226 to web server 246. Web server 246 receives the user request/input indicated at 254 and fetches the requested web page/data from database 250 via communication path 252 if the requested web page/data is not already stored in cache 248. Web server 246 stores the fetched data from database 250 in cache 248 and returns the fetched web page/data as indicated at 256 to web browser 236 via Internet 226.

In one embodiment, once a network connection is established between client computer 222 and server computer 224, a user of client computer 222 can access a desired web page by supplying web browser 236 with a corresponding web address (e.g., a uniform resource locator (URL)) for that web page. A web page, in this context, refers to content accessed via a URL, including text, graphics and other such information. The URL address can be supplied through any of various techniques, such as for example direct keyboard entry by a user, selection among a stored list of addresses (i.e., bookmarks), or clicking on a user interactable component (e.g., link) via a pointing device, such as a mouse, for that URL address, then appearing on a browser control bar or a home page or other web page currently being displayed by web browser 236.

Once a user has supplied input to web browser 236, the browser sends appropriate user requests/input as indicated at 254 to web server 246. This user request/input can be the URL address for a web page itself or a request to retrieve a stored file for a web page for which the user has then supplied an address. Upon receipt of the web pages/data file from web server 246, web browser 236 processes the web pages/data file and assembles and renders a web page represented by the file or updates the already rendered web page with new data from the file. The rendered web page is typically displayed on a local display of client computer 222 from which the user can examine the rendered web page. Once the displayed web page is fully rendered or fully updated or the user has instructed web browser 36 to stop rendering the web page via an explicit stop command or via a click on a link already rendered, the user can then enter a new web address via a link or update data in the rendered web page via a click of another link. For example, in one embodiment by simple successive pointing and clicking of the user pointing device on appropriate links corresponding to desired web pages or updates to web pages, a user can easily retrieve desired web pages or update data in web pages in succession from one or more corresponding web sites during a typical web session.

There is, however, a desire to provide a faster experience to users of a given web site for updating web pages and data in a rendered web page. Furthermore, web pages increasingly have much more rich content. Web pages often render in several phases with different types of static and dynamic content in the phases. The traditional web performance industry page load time (PLT) measurement standards, such as the discussed in the Background Section (e.g., start render time/finish render time and time to last byte (TTLB)) just provide one general PLT number indicating a speed a whole page renders, which cannot reflect the real user experience on rich and/or dynamic content web page. Accordingly, it is difficult for the web performance industry to provide real business, engineering, or marketing data for PLT reporting that properly correlates with real user experience on rich and/or dynamic content web sites.

One embodiment of web server 246, web browser 236, or some web performance software that runs on a suitable computing device, such as computing device 100, performs a page phase time (PPT) method of measuring load time for a web page that includes defining a series of page phases for the duration of the web page load. Each page phase is defined by a start time and end time with each phase start time determined based on estimating user perceptible pixel change amount levels.

Figure 3:
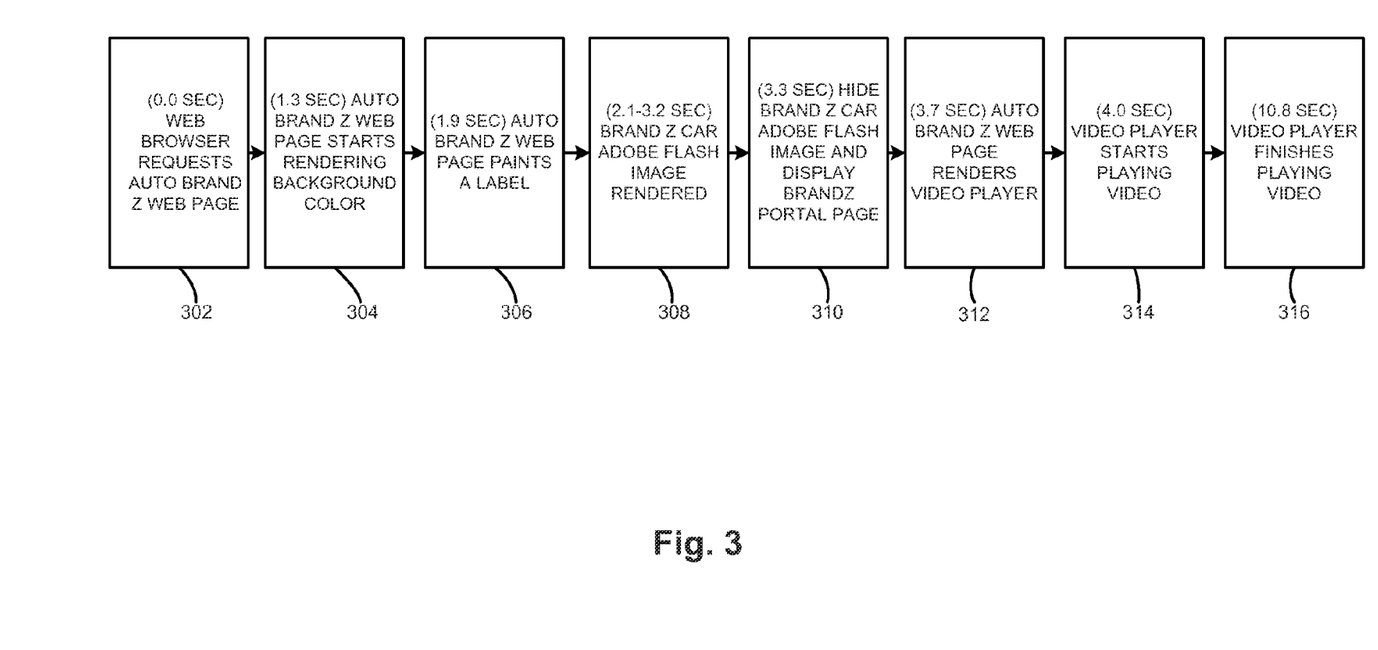
FIG. 3 is a diagram illustrating an example web page load scenario having a chain of video captured screenshots for an example automobile Brand Z web page.

FIG. 3 illustrates an example web page load scenario having a chain of video captured screenshots for an example automobile Brand Z web page with X (e.g., 10) frames captured per second. At 302 (video capture time 0.0 seconds), a client computer's web browser (e.g., web browser 236 of client computer 222) sends a request to the example automobile Brand Z web page. At 304 (video capture time 1.3 seconds), the example automobile Brand Z web page starts rendering something by painting the background color.

At 306 (video capture time 1.9 seconds), the example automobile Brand Z web page paints some meaningful text (e.g., a label in white background). At 308 (video capture time 2.1 seconds to 3.2 seconds), the example automobile Brand Z web page renders a Brand Z car Adobe Flash image. At 310 (video capture time 3.3 seconds), the Brand Z car Adobe Flash image disappears and the example automobile Brand Z web page displays the Brand Z portal page with a selected city view image as the background.

At 312 (video capture time 3.7 seconds), the example automobile Brand Z web page starts to render a video player. At 314 (video capture time 4.0 seconds), the rendered video player in the example automobile Brand Z web page starts playing a video. At 316 (video capture time 10.8 seconds), the video player finishes playing the video in the example automobile Brand Z web page.

The below Table I includes a series of defined page phases for the example automobile Brand Z web page that are easy for a user to visually distinguish between the different page phases during a web page load.

TABLE I

| Phases | Phase Start Time | Phase End Time | Description |
| --- | --- | --- | --- |
| 1 | 1.3 | 1.8 | Renders background color |
| 2 | 1.9 | 2.0 | Paints white label |
| 3 | 2.1 | 3.2 | Renders Brand Z Adobe Flash car image |
| 4 | 3.3 | 3.6 | Displays Brand Z portal |
| 5 | 3.7 | 3.9 | Renders video player |
| 6 | 4.0 | 10.8 | Plays video |

Figure 4:
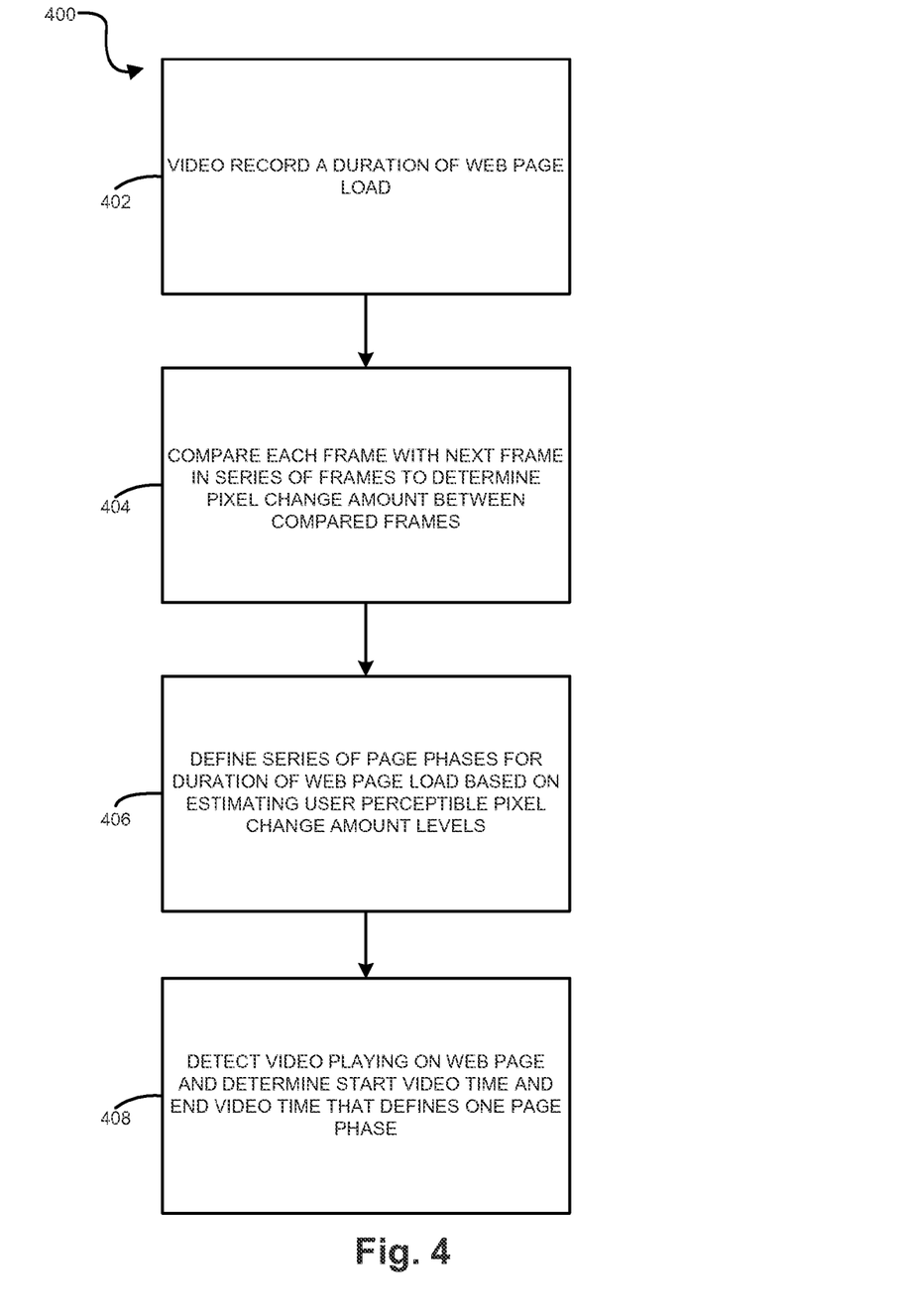
FIG. 4 is a flow diagram illustrating a PPT method that measures load time for a web page that includes defining a series of page phases for the duration of the web page load.

FIG. 4 illustrates a PPT method 400 performed by a web server (e.g., web server 246), a web browser (e.g., web browser 236), or some web performance software that runs on a suitable computing device, such as computing device 100. PPT method 400 measures load time for a web page that includes defining a series of page phases for the duration of the web page load.

At 402, a duration of the web page load is video recorded with X frames captured per second (e.g., 10 frames/second). The video recording includes capturing N frames in a series of frames 1 through N of the web page. In one embodiment, the video recording at 402 is for a whole duration of a web page load. In one embodiment, the video recording at 402 is for only a portion of a whole duration of a web page load. At 404, each frame from frame 1 through frame N−1 is compared with a next frame from frame 2 through frame N in the series of frames to determine a pixel change amount between the compared frames. At 406, a series of page phases are defined for the duration of the web page load. Each page phase is defined by a start time and an end time with each phase start time determined based on estimating user perceptible pixel change amount levels (i.e., easy for a user to visually distinguish between the different page phases). In one embodiment, the pixel change amount is a pixel change ratio (e.g., 30%).

In one embodiment, PPT method 400, during a video playing on the web page, at 408, detects the video playing and determines a start video time and an end video time of the video playing that defines one page phase.

One embodiment of PPT method 400 defines each frame to have a frame capture time. In this embodiment, the defining at 406, for each comparing, if the pixel change amount is greater than a phase threshold, a first of the compared frames' capture time is set as an end time of a previous phase and a second of the compared frames' capture time is set as a start time of a next phase.

One embodiment of PPT method 400 reports PPT information defining the page phases in the series of page phases. In one example of this embodiment, PPT method 400 reports corresponding different PPT information defining corresponding different selected page phases in the series of page phases to corresponding different teams (e.g., different engineering teams, different business teams, and/or different marketing teams).

Figure 5:
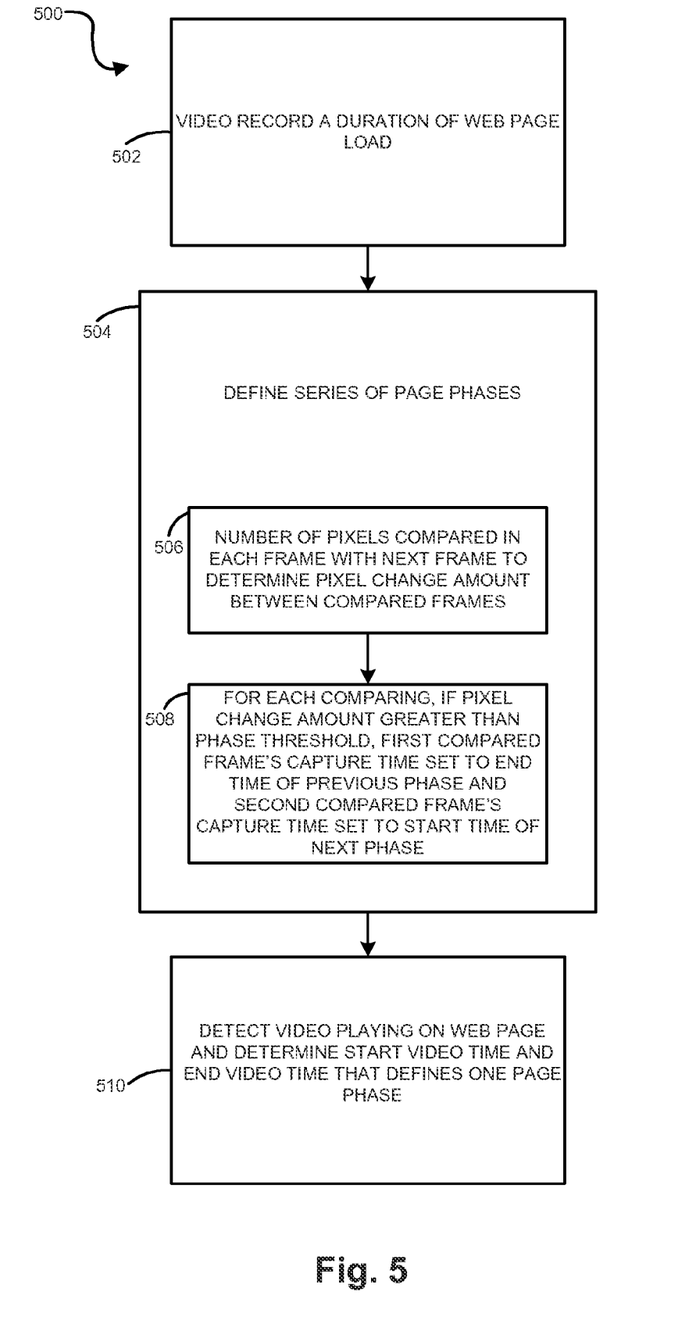
FIG. 5 is a flow diagram illustrating a PPT method that measures load time for a web page that includes defining a series of page phases for the duration of the web page load.

FIG. 5 illustrates a PPT method 500 performed by a web server (e.g., web server 246), a web browser (e.g., web browser 236), or some web performance software that runs on a suitable computing device, such as computing device 100. PPT method 500 measures load time for a web page that includes defining a series of page phases for the duration of the web page load.

At 502, a duration of the web page load is video recorded with X frames captured per second (e.g., 10 frames/second). The video recording includes capturing N frames in a series of frames 1 through N of the web page. Each frame has a corresponding frame capture time. In one embodiment, the video recording at 502 is for a whole duration of a web page load. In one embodiment, the video recording at 502 is for only a portion of a whole duration of a web page load. At 504, a series of multiple page phases are defined for the duration of the web page load. At 506, a number of pixels are compared in each frame from frame 1 through frame N−1 with a next frame from frame 2 through frame N in the series of frames to determine a pixel change amount between the compared frames. At 508, for each comparing, if the pixel change amount is greater than a phase threshold, a first of the compared frames' capture time is set as an end time of a previous phase and a second of the compared frames' capture time is set as a start time of a next phase. In one embodiment, the pixel change amount is a pixel change ratio (e.g., 30%).

In one embodiment, PPT method 500, during a video playing on the web page, at 510, detects the video playing and determines a start video time and an end video time of the video playing that defines one page phase.

Figure 6:
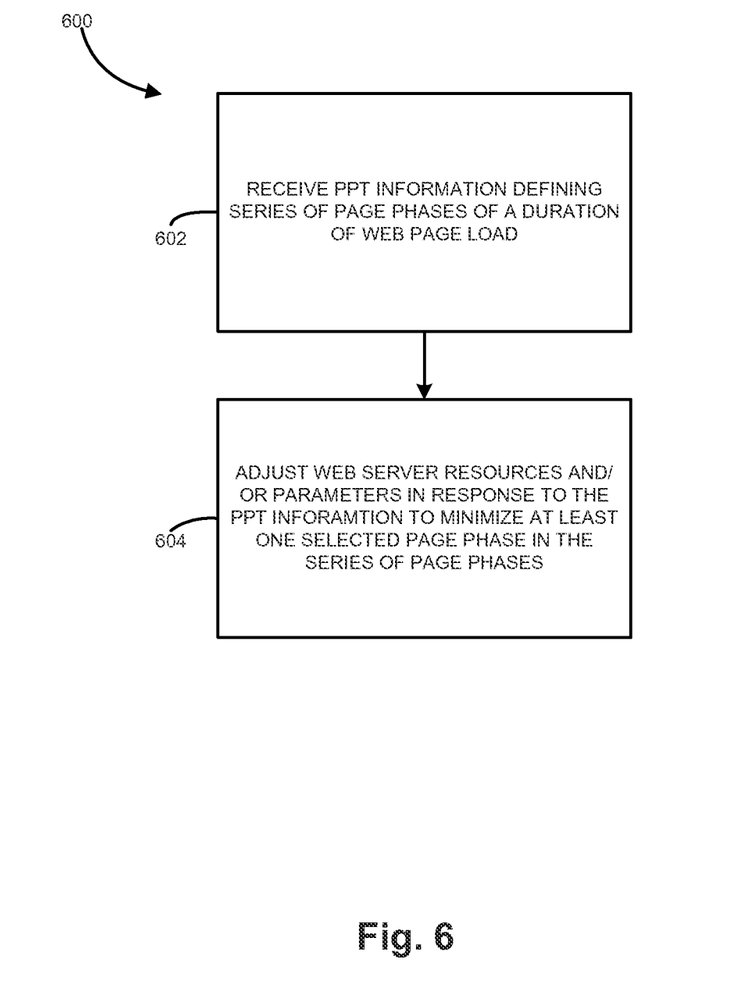
FIG. 6 is a flow diagram illustrating a PPT method that minimizes at least one selected page phase in a series of page phases.

FIG. 6 illustrates a PPT method 600 performed by software that runs on a suitable computing device, such as computing device 100. At 602, PPT information is received. The PPT information defines a series of page phases of a duration of a web page load. In one embodiment, the duration of the web page load is for a whole duration of a web page load. In one embodiment, the duration of the web page load is for only a portion of a whole duration of a web page load. At 604, web server resources and/or parameters are adjusted in response to the PPT information to minimize at least one selected page phase in the series of page phases.

In one embodiment, the adjusting at 604 includes adjusting web server resources and/or parameters to meet business goals. In one embodiment, the adjusting at 604 includes adjusting web server resources and/or parameters to meet engineering goals. In one embodiment, the adjusting at 604 includes adjusting web server resources and/or parameters to meet marketing goals.

In one embodiment of PPT method 600, selected key business content is loaded during the minimized at least one selected page phase in the series of page phases.

One embodiment of PPT method 600 reports corresponding different PPT information defining corresponding different selected page phases in the series of page phases to corresponding different engineering teams, corresponding different business teams, and/or corresponding different marketing teams.

One embodiment of PPT method 600 markets at least one page phase time of the minimized at least one selected page phase in the series of page phases.

The computer implemented PPT method 400 or PPT method 500 can be employed to obtain the defined page phases 1-6 of the above Table I for the example automobile Brand Z web page scenario illustrated in FIG. 3. These defined page phases 1-6 obtained for the example scenario are easy for a user to visually distinguish between the different page phases during a web page load and provide valuable PPT information that defines the page phases in the series of page phases. The PPT information can be reported in a way where corresponding different PPT information defining corresponding different selected page phases in the series of page phases to corresponding different teams (e.g., different engineering teams, different business teams, and/or different marketing teams). The corresponding teams can than properly and precisely adjust web server resources and/or parameters according with PPT method 600 to obtain optimized web page load performance by adjusting minimizing selected page phases in the series of page phases.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage device storing computer-executable instructions for controlling a computing device to perform a method of measuring load time for a web page, the method comprising:
    video recording a duration of the web page load including capturing N frames in a series of frames 1 through N of the web page, wherein N is an integer greater than 1;
    comparing each frame from frame 1 through frame N−1 with a next frame from frame 2 through frame N in the series of frames to determine a pixel change amount between the compared frames, wherein the pixel change amount is a pixel change ratio; and
    defining a series of page phases for the duration of the webpage load, each page phase defined by a start time and an end time with each phase start time determined based on estimating user perceptible pixel change amount levels.

2. The computer readable storage medium of claim 1, wherein the video recording comprises:
    video recording a whole duration of a web page load.

3. The computer readable storage medium of claim 1, wherein the video recording comprises:
    video recording only a portion of a whole duration of a web page load.

4. The computer readable storage medium of claim 1, the method comprising:
    detecting a video playing on the web page and determining a start video time and an end video time of the video playing that defines one page phase.

5. The computer readable storage medium of claim 1, wherein each frame has a frame capture time and the defining comprises:
    for each comparing, if the pixel change amount is greater than a phase threshold, setting a first of the compared frames' capture time as an end time of a previous phase and setting a second of the compared frames' capture time as a start time of a next phase.

6. The computer readable storage medium of claim 1, the method comprising:
    reporting page phase time (PPT) information defining the page phases in the series of page phases.

7. The computer readable storage medium of claim 1, the method comprising:
    reporting corresponding different page phase time (PPT) information defining corresponding different selected page phases in the series of page phases to corresponding different teams.

8. A computing device implemented method of measuring load time for a web page, the method comprising:
    video recording a duration of the web page load including capturing N frames in a series of frames 1 through N of the web page, wherein N is an integer greater than 1, each frame having a frame capture time; and
    defining multiple page phases for the duration of the web page load by:
    comparing a number of pixels in each frame from frame 1 through frame N−1 with a next frame from frame 2 through frame N in the series of frames to determine a pixel change amount between the compared frames, wherein the pixel change amount is a pixel change ratio; and
    for each comparing, if the pixel change amount is greater than a phase threshold, setting a first of the compared frames' capture time as an end time of a previous phase and setting a second of the compared frames' capture time as start time of a next phase.

9. The method of claim 8 wherein the video recording comprises:
    video recording a whole duration of a web page load.

10. The method of claim 8 wherein the video recording comprises:
    video recording only a portion of a whole duration of a web page load.

11. The method of claim 8 comprising:
    detecting a video playing on the web page and determining a start video time and an end video time of the video playing that defines one page phase.

* * * * *